United States Patent [19]

Smith

[11] Patent Number: 4,652,420
[45] Date of Patent: Mar. 24, 1987

[54] HYDROGEN MEASURING DEVICE

[75] Inventor: Robert Smith, Bethesda, Md.

[73] Assignee: Scandpower, Inc., Rockville, Md.

[21] Appl. No.: 559,766

[22] Filed: Dec. 9, 1983

Related U.S. Application Data

[63] Continuation-in-part of Ser. No. 534,717, Sep. 22, 1983, Pat. No. 4,567,013.

[51] Int. Cl.⁴ .............................................. G21C 17/00
[52] U.S. Cl. ...................................... 376/256; 376/247
[58] Field of Search .................................. 376/247, 256

[56] References Cited

U.S. PATENT DOCUMENTS

| | | | |
|---|---|---|---|
| 3,060,726 | 10/1962 | Weber | 376/256 |
| 4,298,430 | 11/1981 | Rolstad et al. | 376/247 |
| 4,313,792 | 2/1982 | Smith | 376/247 |
| 4,459,045 | 7/1984 | Smith | 376/247 |

Primary Examiner—Salvatore Cangialosi
Attorney, Agent, or Firm—Eric P. Schellin

[57] ABSTRACT

The aim of the invention is to measure the partial pressure of very small amounts of free hydrogen gas at various sites in the core of a nuclear reactor. A further aim is to construct such a device to be so rugged as to survive in the reactor environment. Another aim is to construct such a device of materials which will not significantly affect reactivity.

6 Claims, 2 Drawing Figures

HYDROGEN MEASURING DEVICE

RELATED APPLICATIONS

This application is a continuation-in-part of my application Ser. No. 534,717, filed Sept. 22, 1983, now U.S. Pat. No. 4,567,013.

FIELD OF THE INVENTION

This invention pertains to a device for measuring small partial pressures of free hydrogen gas inside a nuclear reactor.

BACKGROUND OF THE INVENTION

During the last 20 years, a number of improvements have been taking place in controlling water chemistry in nuclear reactors and other vessels such as boilers and tanks in power plants and on ships, in a way to minimize corrosion and extend lifetime of the materials from which vessels, tanks and pipe lines are constructed. In the 1960's and 70's, and earlier, materials such as sodium hypo-sulfite (Na(H)So$_3$) and bi-hydrogen phosphate, hydrozinc and other essentially hydrogen-rich oxygen "getters" were being added to waters with the primary purpose of providing free hydrogen to collect free oxygen that would otherwise cause corrosion (oxidation) of metallic components. In the 1970's and 1980's particularly in nuclear plants, water chemists began the introduction of gaseous hydrogen directly into the circulating water, this being made possible by economic considerations, and being desirable to eliminate various undesirable anions and cations introduced along with the hydrogen, when it had been added in relatively unstable chemical compounds. The excesses of free hydrogen also collect free oxygen produced radiologically by neutronic reactions that disassociate cooling water.

It has always been possible to meter the amounts of free hydrogen being added at a single point to systems containing many (sometimes hundreds) of tons of water. It has also been possible to draw samples from various points and measure by chromotography or wet analysis or spectrography how much hydrogen existed in the sample. It has not heretofore been possible, however, to measure exactly how much hydrogen actually existed in water deep inside the systems or vessels at the actual surfaces where corrosion was most damaging. The fuel surfaces in a nuclear reactor for example comprise about 14 acres of surface distributed among 47,000 pins, 12 feet long. Similar large, surface areas exist in steam generator and condensor tubes, where oxidation/corrosion reactions can occur.

SUMMARY OF THE INVENTION

U.S. Pat. No. 4,298,430 to Rolstad et al, the disclosures of which are hereby incorporated by reference, describes a gamma thermometer developed by the assignee of this patent. During the course of the development of the gamma thermometer, much was learned about the leakage of gases through instrument walls. For example if an evacuated canister made of stainless steel is placed in the core environment the free hydrogen gas will pass through the wall of the canister and come to an equilibium at the partial pressure of the free hydrogen in the surrounding coolant water. Hydrogen gas has a high thermal conductivity.

The table below shows some values of thermal conductivity (in Watts/cm$^2$-°C./cm) for various gases at two temperatures:

| Gas | Symbol | M | k (0° C.) | k (300° C.) |
|---|---|---|---|---|
| Hydrogen | H2 | 2 | .0017 | .00290 |
| Helium | He | 4 | .0014 | .00250 |
| Nitrogen | N2 | 28 | .0002 | .00043 |
| Argon | Ar | 40 | .00016 | .00030 |

The combination of high permeability plus high conductivity make hydrogen a nuisance in maintaining the calibration of a gamma thermometer. An insulating vacuum in stainless steel jacketing is impossible to maintain under these conditions. The calibration of a gamma thermometer in which vacuum is used of insulation will shift as the concentration of free hydrogen in the water changes. This shift in calibration provides the principle for a hydrogen concentration measuring device. A gamma thermometer in which the calibration is made insensitive to hydrogen by filling with a gas such as Argon is placed adjacent to a gamma thermometer which has been evacuated. The gas filled and evacuated gamma thermometers are both calibrated to indicate power generation rate in a hydrogen free environment. When placed together in a reactor core different power generation rates will be indicated on the two gamma thermometers. The gamma thermometer filled with gas will indicate true power generation rate. The gamma thermometer which was evacuated will now be contaminated with hydrogen. The difference between the indicated signals of the two gamma thermometers is the measure of the free hydrogen partial pressure when such pressures are very low. When partial pressure of Hydrogen comes into the region where thermal conductivity is no longer increasing with pressure, the device simply indicates that a Hydrogen pressure greater than that of thermal conductivity saturation does exist.

These and further constructional and operational characteristics of the invention will be evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
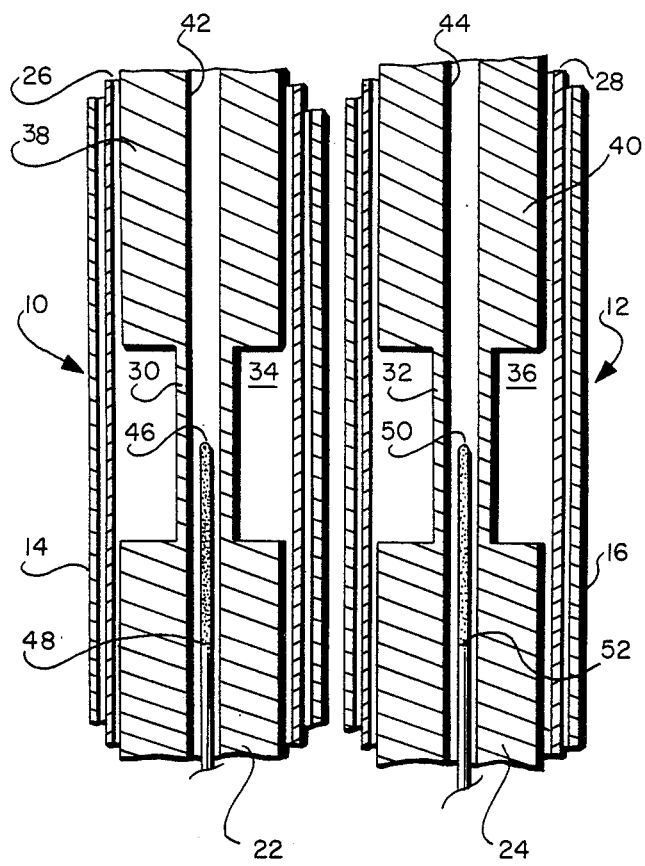
FIG. 1 is a sectional view through a hydrogen sensor adjacent to a gamma thermometer indifferent rods.

Referring now to the drawings wherein reference numerals are used to designate parts throughout the figure thereof, there is shown in FIG. 1 a sectional view of the hydrogen sensor 10 on the left together with a gamma thermometer 12 on the right. The hydrogen sensor 10 is located within a shielding tube 14 in the core of the reactor. Similarly the gamma thermometer is located in a shield tube 16 adjacent to the hydrogen sensor 10. The hydrogen sensor is a cylindrical rod 22 of relatively small diameter and substantial length formed of material having good heat conductivity and good electrical conductivity and preferably formed of a metal such as stainless steel, for example, or an an alloy or of suitable conductive ceramic material, and a tube 26 for shielding the cylindrical rod 22 which is inserted into tube 26. The gamma thermometer has a corresponding rod 24 and tube 28.

The above-mentioned cylindrical rod 22 which is of substantial length is thus capable of extending to the full height of the outer shielding tube 14 within the full assembly of the reactor and is provided with reduced radial portions 30. The gamma thermometer has corresponding reduced radial portions 32. Once the cylindrical rod is placed in position within said tube 14, the reduced-section portions 30 and 32 are located at the level of the zones at which free hydrogen concentration are intended to be measured. These portions are surrounded by annular chambers 34 defined between said portions 30 and the internal wall of the tube 26 in the example of the construction shown. The gamma thermometer has corresponding annular chambers 36. The tube 26 is secured to the normal non-reduced portion 38 of the rod 22 in a fluid tight manner whereby the chambers 34 may be evacuated. Similarly the tube 28 is secured to the normal non-reduced portion 40 of the rod 24 in a fluid tight manner whereby the chamber 36 may be evacuated and then filed with a gas such as Argon.

Also in accordance with the invention, the cylindrical rod 22 has a longitudinal axial bore 42 which extend the full length of said rod. Cylindrical rod 24 has a corresponding bore 44. A plurality of thermocouples are positioned therein. Each thermocouple is positioned so that a hot thermocouple junction 46 is placed substantially at the mid-section of each reduced-section portion 30 and a cold junction 48 is placed beyond the end of the corresponding chamber 34 within the normal-section portion 38 of the cylindrical rod 22. The gamma thermometer has corresponding hot junction 50 and cold junction 52.

In an alternative embodiment the annular chambers 34 and 36 are both evacuated. The tube 26 is made of stainless steel while the tube 28 is made of an outer layer of stainless steel or Inconel for strength and an inner layer of Zircaloy to block the passage of hydrogen.

Figure 2:
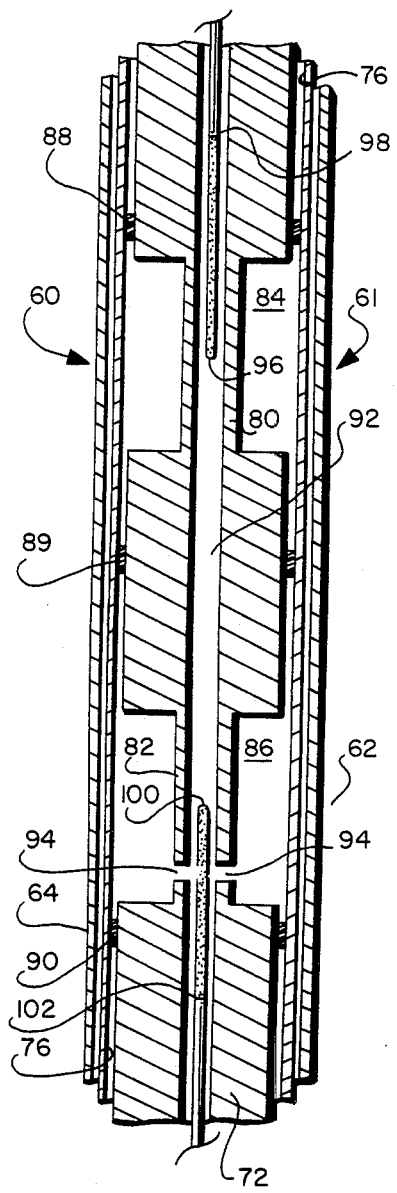
FIG. 2 is a sectional view through a hydrogen sensor adjacent to a gamma thermometer in the same rod.

In a second alternative embodiment the evacuated and argon filled sensors can be located at slightly different elevations coaxially within the same tube, the axial differences in gamma radiation level being so small as to have negligible effect on the two signals. Referring now to FIG. 2 there is shown a sectional view of the combined hydrogen sensor and gamma thermometer assembled in one rod at 50. The sensor assembly is located within a fixed shielding tube 64 in the core of the reactor. The hydrogen sensor and gamma thermometer are formed in a single cylindrical rod 72 of relatively small diameter and substantial length formed of material as described for the embodiment above. The rod 72 is sealed into a shielding tube 76 to form the assembly before inserting the assembly into the fixed shielding tube 64.

The hydrogen sensor is shown generally at 61 and the gamma thermometer generally at 62. Each of these two sensors has identical reduced radial portions at 80 and 82, forming annular chambers 84 and 86 with the inner wall of the tube 76. The rod 72 has an axial bore 92 which extends the full length of the rod 72. Thermocouples are shown in the hydrogen sensor and gamma thermometer with hot junctions at 96 and 100 and cold junctions at 98 and 102.

Before the shielding tube 76 is closed, the tube is evacuated. Then the tube 76 is swaged or otherwise sealed to the rod 72 at the sealing rings 88, 89, and 90. Thereafter the chamber 84 is sealed off from gases excepting hydrogen passing through the walls of the shielding tube 64. The chamber 86 is connected to the axial bore 92 through one or more filling holes 94. Argon or other suitable gas of low thermal conductivity is introduced into the chamber 86 through the axial bore 92 and filling hole 94. Finally the tube 76 would be sealed.

In a variation on this embodiment if the filling holes 94 were put into the chamber 84 of the hydrogen sensor and not in the gamma thermometer then the filling and evacuating steps would be reversed. First there would be a preliminary step to evacuate the tube 76, then it would be filled with argon, then the rings would be sealed, and the hydrogen sensor would be evacuated. The tube 76 would then be sealed.

Any of the above embodiments may be combined with ohmic heating of the rods 22 and 24 for calibration purposes as described in the Rolstad U.S. Pat. No. 4,298,430.

Furthermore, in an vessel having no gamma heating the hydrogen sensor can be operated by itself using ohmic heating; in such an environment the sensor readings can be obtained directly as the difference between the reading with free hydrogen present and the reading at the same heating current without hydrogen present. When gamma radiation is present such as in the reactor environment it is necessary to have a gamma thermometer adjacent to the hydrogen sensor to correct the reading of the hydrogen sensor for fluctuations in power generation rate. The hydrogen measure can then be taken as the difference between the indicated temperature difference in the hydrogen sensor minus the indicated temperature difference in the gamma thermometer, or the sensing differential thermocouples can be connected in series opposition such that the net signal measures only the effect of hydrogen.

The hydrogen sensor so constructed can measure partial pressures of free hydrogen between about $10^{-7}$ atm. and $10^{-3}$ atm. At pressures above $10^{-3}$ atm. the signal of the hydrogen filled chamber no longer decreases so that the difference in signals becomes simply an indicator that hydrogen is present in concentrations equal to or greater that $10^{-3}$ atm.

Other details of gamma thermometer construction can be seen in U.S. Pat. Nos. 4,313,792, 4,356,601, 4,411,858, 4,411,859, 4,418,035, 4,425,297, 4,439,396, 4,440,716, and 4,459,045, all assigned to the assignee of this patent, the disclosures of which are incorporated by reference.

Inconel is a trademark for a nickel-chromium alloy made by Huntington Alloys Inc., Huntington W. Va. Zircaloy is a trademark for a zirconium alloy made by Westinghouse Electric Corp., Specialty Metals Div., Blairsville, Pa.

This invention is not limited to the preferred embodiments and alternatives heretofore described, to which variations and improvements may be made, consisting of mechanically and electrically equivalent modifications to component parts and procedures without leaving the scope of the present patent, the characteristics of which are summarized in the following claims.

What is claimed is:

1. A device for measuring free hydrogen concentration in the coolant of a nuclear reactor, the device comprising:

a gamma thermometer comprising an elongated rod that is housed in a sheath, the rod is provided with a series of enclosed annular spaces, disposed longitudinally along the gamma thermometer, that are formed between the rod and the sheath, a plurality of difference thermocouples are disposed along the rod having hot and cold junctions, the hot junctions of the thermocouples are positioned adjacent the annular spaces and the cold junctions are positioned between the annular spaces;

whereby the annular spaces form annular heat insulating chambers for the hot junctions of the thermocouples, two adjacent annular spaces and the related two difference thermocouples form a hydrogen measuring zone, a vacuum is formed in one of the annular heat insulating chambers of measuring zone for insulating the hot junction and providing a space in which free hydrogen can collect, in the other annular heat insulating chamber of each hydrogen measuring zone a gas other than hydrogen is disposed therein to prevent hydrogen contamination of the annular space; and the free hydrogen partial pressure can be calculated from the comparison of the indicated power generation rates of the two difference thermocouples in each hydrogen measuring zone.

2. A device as defined by claim 2 wherein the gamma thermometer is provided with a plurality of hydrogen measurement zones longitudinally disposed along the length of the gamma thermometer.

3. A device as defined by claim 1 wherein the gas other than hydrogen is argon.

4. A device for measuring free hydrogen concentration in the coolant of a nuclear reactor, the device comprising:

a gamma thermometer comprising an elongated rod that is housed in a sheath, the rod is provided with a series of enclosed annular spaces, disposed longitudinally along the gamma thermometer, that are formed between the rod and the sheath, a plurality of difference thermocouples are disposed along the rod having hot and cold junctions, the hot junctions of the thermocouples are positioned adjacent the annular spaces and the cold junctions are positioned between the annular spaces;

whereby the annular spaces form annular heat insulating spaces for the hot junctions of the thermocouples, two adjacent annular spaces and the related two difference thermocouples form a hydrogen measuring zone, a vacuum is formed in one of the annular heat insulating chambers of each hydrogen measuring zone for insulating the hot junction and providing a space into which free hydrogen can collect, the sheath surrounding the other annular heat insulating chamber of each hydrogen measuring zone is formed of a hydrogen from entering the other annular heat insulating chamber; and free hydrogen partial pressure can be calculated from the comparison of the indicated power generation rates of the two difference thermocouples in each hydrogen measuring zone.

5. A device as defined by claim 4 wherein the gamma thermometer is provided with a plurality of hydrogen measurements zones disposed longitudinally along the length of the gamma thermometer.

6. A device as defined by claim 4 wherein the hydrogen blocking material is a zirconium alloy.

* * * * *